United States Patent [19]

Grant

[11] Patent Number: 4,777,990
[45] Date of Patent: Oct. 18, 1988

[54] AUTOMATIC SHUT-OFF LIQUID DISPENSING NOZZLE

[76] Inventor: Richard L. Grant, 3216 E. Roveen Ave., Phoenix, Ariz. 85032

[21] Appl. No.: 905,874

[22] Filed: Sep. 10, 1986

Related U.S. Application Data

[63] Continuation-in-part of Ser. No. 715,747, Mar. 25, 1985, abandoned.

[51] Int. Cl.[4] .............................................. F16K 31/18
[52] U.S. Cl. .................... 141/201; 137/448; 141/205; 222/153; 222/529
[58] Field of Search ................ 220/85 F, 86 R; 141/199–205, 211, 213, 216, 220, 229, 198; 137/410, 448; 222/519, 153, 520, 571

[56] References Cited

U.S. PATENT DOCUMENTS

| | | | |
|---|---|---|---|
| 1,160,883 | 11/1915 | Hamer | 222/481 X |
| 1,246,033 | 11/1917 | Adams | 141/205 |
| 1,310,405 | 7/1919 | Deppermann | 222/567 |
| 2,106,470 | 1/1938 | Shonnard | 222/48 X |
| 2,340,936 | 2/1944 | Cook | 141/216 X |
| 2,418,280 | 4/1947 | Steen | 141/220 |
| 2,504,450 | 4/1950 | Rhodes | 141/213 |
| 2,507,545 | 5/1950 | Samiran | 141/213 X |
| 2,641,376 | 6/1953 | Parziale | 222/529 X |
| 3,006,506 | 10/1961 | Germano | 222/502 X |
| 3,104,039 | 9/1963 | Dike | 222/545 X |
| 3,176,728 | 4/1965 | Baumann | 141/199 |
| 3,206,083 | 9/1965 | Nishina | 222/568 X |
| 3,384,276 | 5/1968 | Henningfield | 222/479 |
| 4,098,307 | 7/1978 | Taylor | 141/220 |
| 4,281,775 | 8/1981 | Turner | 222/520 X |
| 4,426,027 | 1/1984 | Maynard, Jr. | 222/529 |
| 4,583,668 | 4/1986 | Maynard, Jr. | 222/529 |
| 4,667,711 | 5/1987 | Draft | 141/198 |

FOREIGN PATENT DOCUMENTS

| | | | |
|---|---|---|---|
| 346417 | 12/1920 | Fed. Rep. of Germany | 141/331 |
| 306383 | 3/1933 | Italy | 222/520 |

Primary Examiner—Kevin P. Shaver
Attorney, Agent, or Firm—M. David Shapiro

[57] ABSTRACT

A filling nozzle which is releasably secured to a container through which liquid can be dispensed from the container into another receptacle when the nozzle is directed downwardly in a liquid dispensing position. The nozzle contains a butterfly valve for automatically shutting off the flow of liquid from the container to the receptacle when the receptacle is substantially filled.

3 Claims, 2 Drawing Sheets

AUTOMATIC SHUT-OFF LIQUID DISPENSING NOZZLE

This application is a continuation-in-part of application Ser. No. 715,747 filed Mar. 25, 1985, now abandoned.

FIELD OF THE INVENTION

This invention relates to funnels, and more particularly, to a funnel eliminating device.

BACKGROUND OF THE INVENTION

A person wishing to partly or fully refuel a fuel tank for an internal combustion engine, or any other fuel consuming device, at a point remote from a fixed base fuel pumping station, may use a rudimentary portable fuel container comprising a small tank fitted with a pouring spout which typically is somewhat flexible in its structure. Particularly when the portable contain is full or near full, it is difficult to transfer the fuel from that container to the container to be refilled without spilling some of the fuel. Of course, it will be recognized that such spilled fuel represents a serious safety hazard.

In those cases where the fuel tank to be refilled is integral with the engine or device using that fuel, such as is the case with lawn mowers, small outboard engines for marine use, and the like, the hazard may be even greater because the tank and its surroundings are frequently very hot when the engine or device has just been used and has run the fuel out of its typically small fuel tank. Thus, a source of ignition for fuel vapors and liquid fuel is ready at hand.

Of course, aside from the safety considerations set forth, supra, it is very undesirable for a person handling such portable fuel units to have fuel, especially gasoline, spill on his or her person or clothing because of the obnoxious and long lasting odor.

Funnels have been used to aid in directing fuel from such portable containers into the tank to be filled. That practice further complicates the operator's attempts to monitor fuel flow to prevent overfilling. Generally, by the time fuel rises in the filled tank to the level of the funnel spout, it is too late to remove the funnel from the tank because of the volume of fuel remaining in the funnel at that time. As a result, spillage occurs nearly every time.

SUMMARY OF THE INVENTION

The principal object of this invention is to provide a funnel eliminating device, which will be unique in design, in that it will totally prevent spilling gasoline or other highly combustible fuels when filling the fuel tanks of automotive vehicles, boats, farm machinery, construction equipment, etc.

Another object of this invention is to provide a funnel eliminating device, which will substantially reduce the hazzard of a fire starting by spilled fuel, which often occurs when employing a funnel to transfer fuels to the fuel tanks of internal combustion engines.

Another object of this invention is to provide a funnel eliminating device, which will be of such design, as to enable its user to see when to stop the flow of gasoline when filling the smaller tanks of lawn mowers and the like, which is not possible with the use of a funnel, and it will be fabricated of a suitable rubber or plastic material, so as to prevent scratching vehicles, such as, four-wheel drive land pick-ups or other vehicles, and the device will include shut-off means in the pouring end thereof.

A further object of this invention is to provide a funnel eliminating device, which will be provided with a threaded neck for being adapted to screw onto the threaded necks of gasoline cans and the like.

Other objects are to provide a funnel eliminating device which is simple in design, inexpensive to manufacture, rugged in construction, easy to use, and efficient in operation.

These, and other objects, will be readily evident, upon a study of the following specification, and the accompanying drawing, wherein:

DETAILED DESCRIPTION

Figure 1:
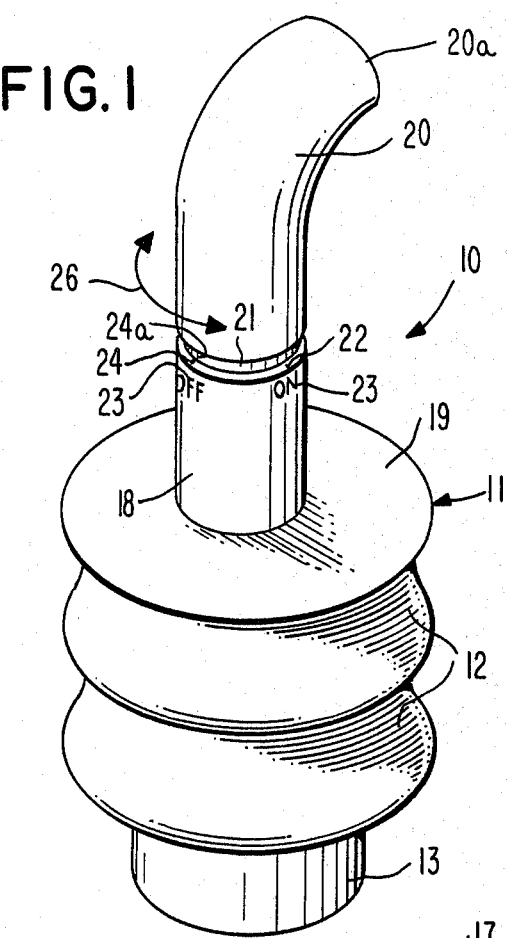
FIG. 1 is a perspective view of the present invention.

Accordingly, a device 10 is shown to include a barrel 11 of cylindrical configuration, having a pair of adjacent and annular recesses 12 in its side wall, and barrel 11 is fabricated of a suitable chemical resistant rubber or plastic material, which is resilient, enabling barrel 11 to be vertically compressed, and a coil spring may be included on the interior of barrel 11, if desired in the manufacture thereof, for fast vertical expansion. A centrally disposed bottom neck 13 projects from bottom wall 13a of barrel 11, which is integrally attached to wall 13a. Wall 13a is integrally attached to the bottom of barrel 11, and neck 13 includes a plurality of internal threads 14, which are designed to engage with the external threads 15 of a spout 16 of a typical gasoline can 17, or other container used for the storage of fuel. An upper neck 18 is provided and is integrally attached to the center of the top of upper wall 19, which is also integrally attached to barrel 11, and a spout 20 is provided and includes an arcuately curved pouring end 20a for entry into the filler opening of a gasoline tank of a vehicle or other piece of equipment. Spout 20 includes a smaller diameter sleeve 21, which is integrally attached to its lower end and received rotatably within the upper neck 18, and extends partially downward in neck 18. A graduation line or mark 22 is scored into the top of neck 18, and is adjacent to letter characters 23, which spell the word "on", and a similar mark 24 spaced from mark 22 in neck 18, is adjacent to letter characters 25, which spell out the word "off". The words "on" and "off" are scored on the outer periphery of the top portion of the neck 18, and their associated marks 22 and 24, serve to align with a similar score mark 24a on the outer periphery of spout 20, for use in indicating when the spout 20 is rotated to its full flow position, or its shut-off position, and it is to be noted, that the abovementioned arrangement is used in combination with a typical flow shut-off means, in the neck 18 and barrel 11, (not shown).

In use, neck 13 is threaded onto the spout 16 of gasoline can 17, and with the spout 20 rotated to the off position indicated by the marks 24 and 24a, the can 17 is lifted by the user and the spout 20 entered into the filler neck of the gasoline tank to be filled. When entered, the spout 20 is rotated until the marks 22 and 24a align, which enables free flow of the gasoline through the barrel 11 and out of the spout 20, into the gasoline tank.

Figure 3:
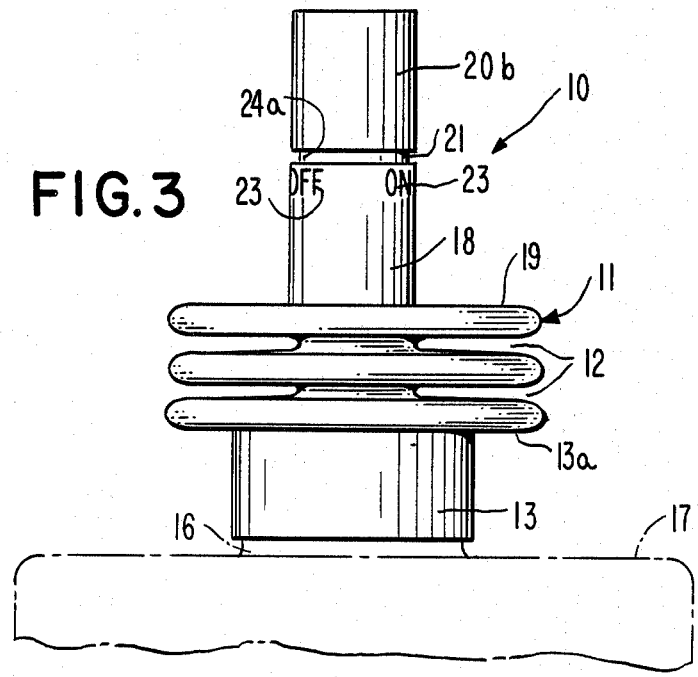
FIG. 3 is a side elevational view of a modified form of the invention, showing the bellows portion in collapsed condition.

Looking now at FIG. 3 of the drawing, device 10 is modified to have a straight spout 20b in place of the formerly described curved one, and barrel 11 is shown in the compressed condition.

In use, the operation is the same as heretofore described, with the exception, that the straight spout 20b is employed in the design.

Figure 4:
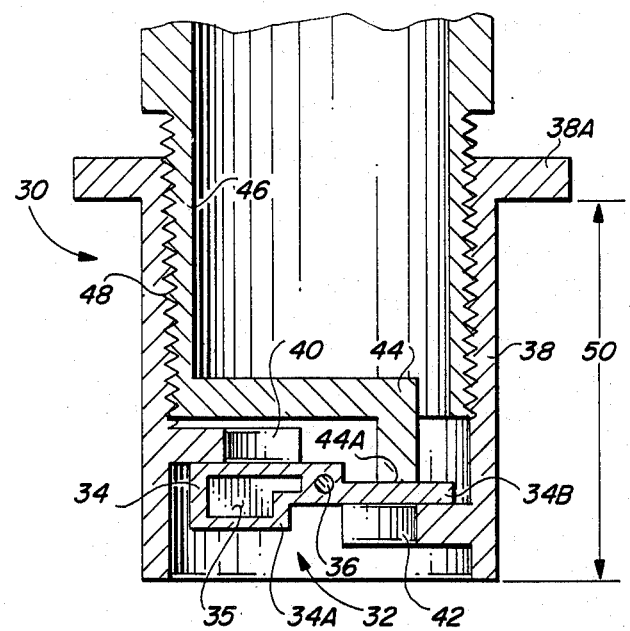
FIG. 4 illustrates in cross section a self closing butterfly valve assembly, shown with valve 34 in a closed position.
Figure 4B:
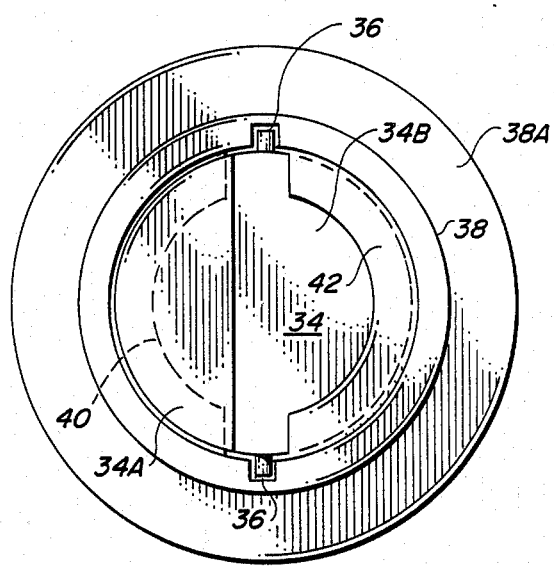
FIG. 4B is a view of FIG. 4 looking into outlet port 32.
Figure 5:
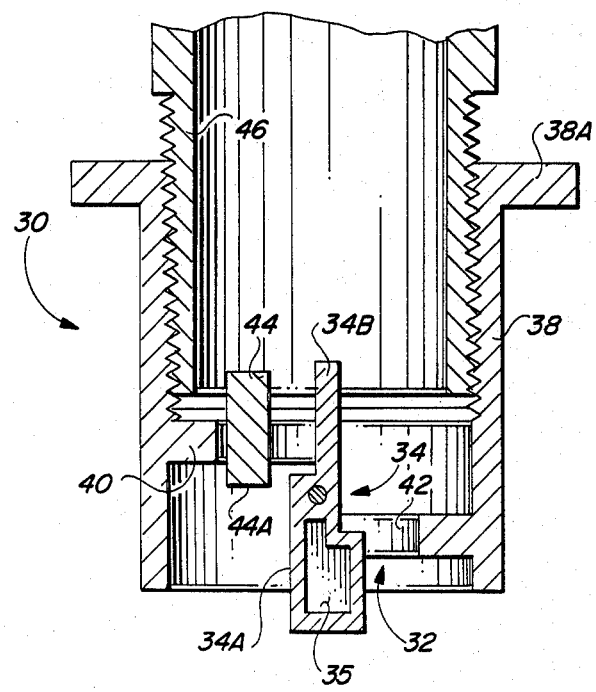
FIG. 5 is a cross sectional view of the butterfly valve assembly of FIG. 4, shown with valve 34 in an open position.
Figure 5B:
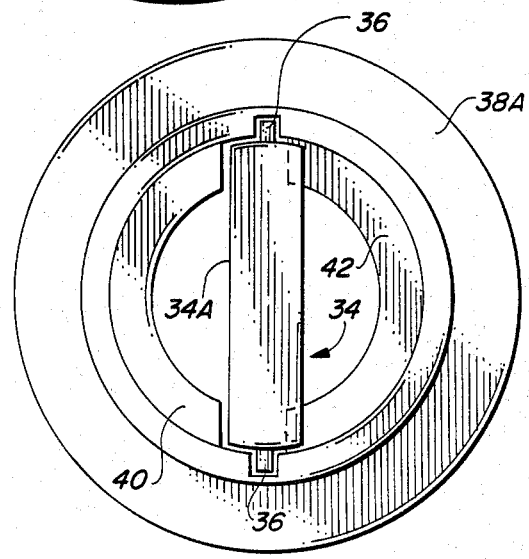
FIG. 5B is a view of FIG. 5 looking into outlet port 32.

It is advantageous to incorporate an automatic shut-off feature in the fuel valve of the invention. A preferred embodiment of such a shut-off-valve 30 is shown in FIGS. 4, 4B, 5 and 5B. Referring first to FIGS. 4 and 4B, it will be seen that FIG. 4 depicts a cross section of the features of the automatic shut-off valve, shown in a locked-closed position. Outlet port 32 is shown at the bottom of FIG. 4 and an end view, looking into outlet port 32 from the outside is shown in FIG. 4B. Butterfly valve 34 is shown in a closed position. Butterfly valve 34 is pivoted at 36 on a diameter line of outer shell 38 with pin features which are rotatable within recesses in outer sleeve 38. On one side 34A of pivot 36, butterfly valve 34 may be made hollow, as shown at 35. That technique provides for the weight of the non-symmetrical volume of valve 34 to be reasonably evenly distributed on either side of pivot point 36. The object of the configuration shown is to provide more buoyancy in one side 34A of valve 34 than in opposite side 34B while maintaining a nearly equal weight balance between the two sides or, by making the buoyancy force greater than the weight on the higher volume side while providing less buoyancy on the less voluminous side. When in the position shown in FIG. 5, the net buoyancy to weight ratio of the two sides of butterfly valve 34 should cause valve 34 to close when immersed in fuel.

That object may also be accomplished by making valve 34 of a less dense material than the fuel which is to be valved. The greater volume on one side 34A of valve 34, as shown in FIG. 4, would then make that side more buoyant than the other side 34B. The importance of this buoyancy arrangement will be further explained, infra.

Outer sleeve 38 has two ledge like features, upper ledge 40 and lower ledge 42. Valve 34 rests against these ledges 40, 42 when in the closed position, as shown. This configuration helps to provide a leak proof seal between closed valve 34 and outer shell 38.

Inner shell 46 is equipped with lock feature 44 extended from an inner side wall of shell 46, parallel to, but not coincident with, a diameter line of shell 46. Tip 44A of lock 44 bears on butterfly valve 34, side 34B, to lock it in a closed position, as shown in FIGS. 4 and 4B.

Outer shell 38 is threaded 48 onto inner shell 46. Thread 48 is preferably a rather course thread (large pitch) so that when outer shell 38 is rotated about inner shell 46, there is significant relative axial movement between shells 38, 46, even when the rotation is only ninety degrees. Thus, tip 44A of lock feature 44 moves axially within inner shell 46, as well as rotating about the longitudinal axis of shells 38, 46. This may be seen in FIG. 5 where inner shell 46 has been rotated 90 degrees with respect to outer shell 38 and no longer is in the plane of valve 34 which is shown in an open position. Operating feature 38A may be equipped with "open" and "closed" markings (not shown) to aid the user in operation. Distance 50 from operating feature 38A to the outlet end 32 of device 30 may be chosen for best operation with the class of containers to be filled. Distance 50 determines how deep outlet end 32 may be inserted into the filler inlet of the container to be filled and, preferably, the operator would always insert device 30 to the maximum depth allowed by distance 50 to assure fuel flow cut-off prior to overflow of the filled container.

Outer shell 38 may be terminated at lower end or outlet port 32 with a necked down outlet tube (not shown) having a smaller diameter than the main portion of outer shell 38 for the purpose of providing for easier transfer of fuel into a smaller opening in a tank or container to be supplied fuel from device 30 of the invention.

Figure 2:
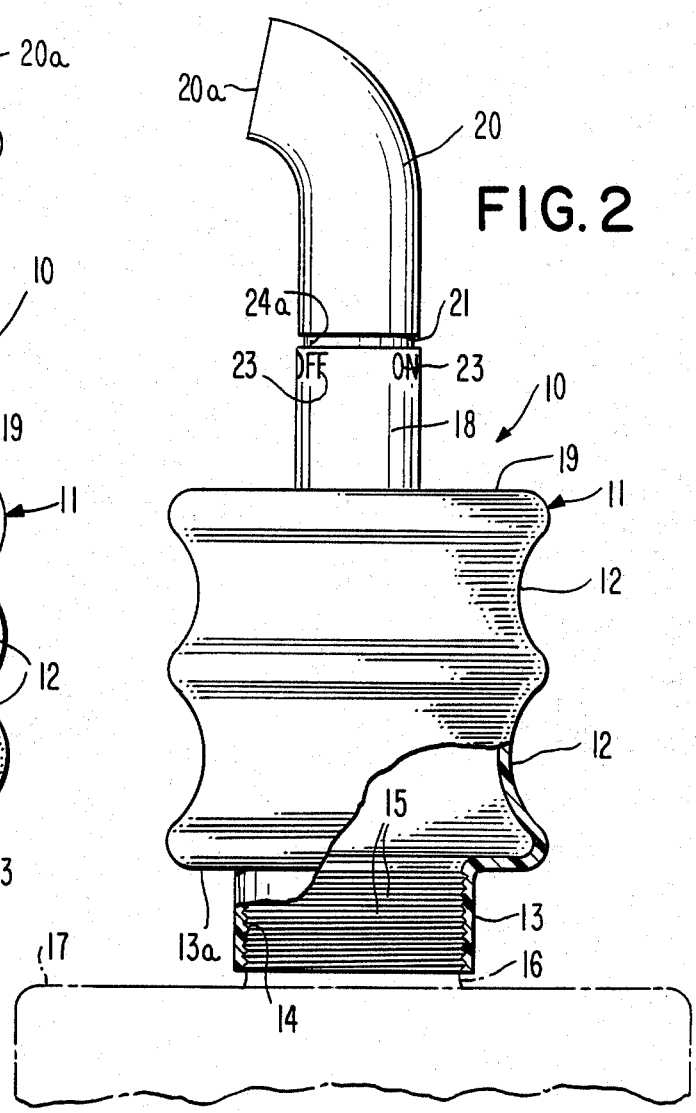
FIG. 2 is a side elevational view of FIG. 1, shown partly broken away, and illustrating a gasoline tank fragmentary and in phantom lines.

Inner shell 46 must be connected to the supply tank or container of the portable fuel supply system. That connection may incorporate the convoluted barrel structure 10 (FIG. 1) or 11 (FIG. 2) having a diameter which is significantly larger than the diameter of inner shell 46 and having threaded neck 13 for attachment to tank 17 as shown in FIG. 2 and 3. Of course, other means for making that connection to tank 17 or its equivalent will be apparent to one of ordinary skill. The advantage of using the barrel structure 10, 11 is believed to lie in the superior resistance to damage afforded by such a structure.

While various changes may be made in the detail construction, it is understood that such changes will be within the spirit and scope of the present invention, as is defined by the appended claims.

What I now claim is:

1. A filling device for mounting on a first liquid container used for containing a liquid for filling a second liquid container, the filling device comprising:
   nozzle means for transferring said liquid from the first liquid container to the second liquid container, said nozzle means further comprising:
      a tubular member having a valve means therein for automatically responding to a rise in a liquid level in an output end of said nozzle means, said valve means further comprising:
         a butterfly valve having a central pivot axis within said tubular member, a first portion of said butterfly valve being on one side of said central pivot axis and a second portion of said butterfly valve being on another side of said central pivot axis, said first valve portion having a first buoyancy and said second valve portion having a second buoyancy, said first buoyancy being greater than said second buoyancy whereby said rising level of liquid in said tubular member causes the valve means to close;
   and wherein said nozzle means further comprises:
      a first nozzle portion;
      a second nozzle portion, said butterfly valve means being pivotally mounted within said second nozzle portion, said second nozzle portion being threadedly engaged over said first nozzle portion; and said first nozzle portion further comprises:
    means for locking said butterfly valve in a closed position when said second nozzle portion is threadedly rotated onto said first nozzle portion.

2. The filling device according to claim 1 further comprising:
    a resilient compressible section having a significantly larger diameter than a diameter of said tubular member, said resilient compressible section being positioned between said first liquid container and said tubular member.

3. The filling device according to claim 2 wherein said compressible section comprises a plurality of annular recesses around a side wall of said compressible section.

* * * * *